(12) United States Patent
Park

(10) Patent No.: US 7,924,364 B2
(45) Date of Patent: Apr. 12, 2011

(54) LIQUID CRYSTAL DISPLAY MODULE AND ASSEMBLING METHOD THEREOF

(75) Inventor: Jaesung Park, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 349 days.

(21) Appl. No.: 12/314,528

(22) Filed: Dec. 11, 2008

(65) Prior Publication Data
US 2009/0303409 A1 Dec. 10, 2009

(30) Foreign Application Priority Data

Jun. 10, 2008 (JP) .......................... 10-2008-0054266

(51) Int. Cl.
G02F 1/1333 (2006.01)
G02F 1/1335 (2006.01)
(52) U.S. Cl. .............................. 349/58; 349/65; 349/113
(58) Field of Classification Search ........................ None
See application file for complete search history.

(56) References Cited

U.S. PATENT DOCUMENTS

| | | | | |
|---|---|---|---|---|
| 5,392,199 A * | 2/1995 | Kashima et al. | ............... | 362/606 |
| 6,392,724 B2 * | 5/2002 | An et al. | .......................... | 349/58 |
| 6,580,478 B2 * | 6/2003 | Kim | ................................ | 349/65 |
| 6,734,928 B2 * | 5/2004 | Ito et al. | ........................... | 349/58 |
| 6,914,646 B2 * | 7/2005 | Kim | ................................ | 349/65 |
| 7,139,047 B2 * | 11/2006 | Park | ................................ | 349/58 |
| 7,301,588 B2 * | 11/2007 | Ogawa | ............................ | 349/58 |
| 7,593,070 B2 * | 9/2009 | Ogawa | ............................ | 349/58 |
| 2006/0285030 A1 * | 12/2006 | Kim | ................................ | 349/58 |
| 2007/0030412 A1 * | 2/2007 | Park | ................................ | 349/58 |

FOREIGN PATENT DOCUMENTS

JP 2008-112633 5/2008

\* cited by examiner

*Primary Examiner* — Rhonda S Peace
(74) *Attorney, Agent, or Firm* — Morgan, Lewis & Bockius LLP

(57) ABSTRACT

A liquid crystal display module, which can prevent corrugations of a reflection plate, and an assembling method thereof are disclosed. The liquid crystal display module comprises: a liquid crystal panel; a light source assembly; a light guide plate; a reflection plate; a support main; and a cover bottom, the reflection plate being disposed to be spaced a predetermined gap from the inner wall surfaces of the support main, the light guide plate being fixed to lateral stepped faces formed on a lateral inner wall surface of the supporter main while maintaining a first gap between the light guide plate and the reflection plate, and the light source assembly being fixed between an inner wall surface of a light incident portion of the support main and an incident surface of the light guide plate while maintaining a second gap between the light source assembly and the reflection plate.

8 Claims, 7 Drawing Sheets

LIQUID CRYSTAL DISPLAY MODULE AND ASSEMBLING METHOD THEREOF

This application claims the benefit of Korean Patent Application No. 10-2008-0054266 field on Jun. 10, 2008, which is hereby incorporated by reference in its entirety.

BACKGROUND OF THE INVENTION

1. Field of the Invention

This document relates to a liquid crystal display module, and more particularly, to a liquid crystal display module, which can prevent corrugations of a reflection plate, and an assembling method thereof.

2. Related Art

In a recent information-oriented society, the importance of display devices used as visual information conveying media has been emphasized. However, cathode ray tubes or Braun tubes that have been widely used have major disadvantages in regard to their large size and weight. There has therefore been developed various types of flat display apparatuses capable of overcoming the disadvantages of cathode ray tubes.

Examples of currently commercially available flat panel displays include a liquid crystal display (LCD), a field emission display (FED), a plasma display panel (PDP) and an electroluminescence display (EL).

Among them, liquid crystal displays (LCDs) show a tendency that their application fields are gradually increased due to the characteristics of light weight, thin thickness, low-power-consumption driving, and so on. With this trend, the LCDs are used as displays for portable computers such as laptop computers, office automation devices, audio/video devices, indoor/outdoor advertising display devices, and the like. The LCDs display a desired picture on a screen by controlling the transmissivity of light beam in accordance with a video signal applied to a plurality of control switches arranged in a matrix. The LCDs have been rapidly developed to larger sizes and higher resolutions due to improvements in mass production technology and the fruitful result of research and development.

In general, a liquid crystal display (LCD) comprises a liquid crystal display module (LCM) and a driving circuit unit for driving the liquid crystal display module.

The liquid crystal display module comprises a liquid crystal panel in which liquid crystal cells are arranged in matrix between two sheets of glass substrates, and a backlight unit for irradiating light to the liquid crystal panel. The liquid crystal panel and the backlight unit should engage with each other in an integral shape to prevent light loss and have protection from a damage caused by an external impact. Thus, a case for the LCD enclosing the back light unit including the edge of the liquid crystal panel is provided.

There are two types of backlight units for a liquid crystal display module: a direct-below-type, and an edge-type. The edge-type backlight unit has a light source installed on the outside of a flat panel, and thus the light from the light source is incident to the entire surface of the liquid crystal panel by using a transparent light guide plate. The direct-below-type backlight unit has a light source arranged at a rear surface of the liquid crystal panel, and the light source directly radiates light to the liquid crystal panel.

FIG. 1 shows a cross sectional view of a light incident portion of a conventional liquid crystal display module employing a edge type backlight unit. FIG. 2 shows an assembly order of the conventional liquid crystal display module.

Referring to FIGS. 1 and 2, with regards to the assembly order of the conventional liquid crystal display module, first, a support main 2 for supporting the entire liquid crystal display module is assembled, and then a light source assembly 10 having a light source FPC (flexible printed circuit) 9 attached thereto is mounted on a projecting, lower stepped face of the support main 2. Next, a light guide plate 11 for converting a light from the light source assembly 10 into a surface light source is mounted on a projecting, lower stepped face of the support main 2. And, a reflection plate 12 for reflecting a light, which progresses to a lower surface and side surfaces of the light guide plate, to the upper surface is mounted on a recessed, lower stepped face of the support main 2, and then a cover bottom 13 is fixed to the bottom surfaces of the light source assembly 10 and light guide plate 11 by engagement. Next, a plurality of optical sheets 8 for controlling a diffusion and a direction of travel of the light passing through the light guide plate 11 is mounted on the light guide plate 11. A light blocking tape 7 is attached onto the optical sheets 8 and a projecting, upper stepped face the support main 2 to prevent light loss. A liquid crystal panel 5 including upper and lower array substrates 3 and 4 and a liquid crystal panel assembly consisting of upper and lower polarizing plates 6a and 6b are mounted on the light blocking tape 7, and then a case top 1 for surrounding the edge of the liquid crystal panel assembly is fastened.

However, such a conventional liquid crystal display module has the following problems.

First, the conventional liquid crystal display module is problematic in that corrugations are generated on the reflection plate 12 when an operation test is conducted in a high-temperature or high-humidity environment. These corrugations are caused by the facts that the probability of exposure to thermal expansion is high because the reflection plate 12 is arranged adjacent to the light source assembly 10 having relatively high heat generation, and that there are a lot of constraining points P1, P2, and P3 between the reflection plate and other equipment items 2, 10, and 11 as the liquid crystal display module is assembled in a reverse assembly order as shown in FIG. 2. The corrugations of the reflection plate 12 tends to become larger if there occurs a burr of the other equipment items targeted by the constraining points P1, P2, and P3 or a problem of dimensional management of these equipment items.

Second, to alleviate the constraining points P1, P2, and P3, there is a need to manage the dimensions, such as i) a height A of the mounting end of the reflection plate 12 of the support main 2, ii) a gap B between the light source assembly 10 and the reflection plate 12, and iii) a gap B between the light guide plate 11 and the reflection plate 12, within a range of generating no constraint. There is a limitation in managing the dimensions due to the aforementioned reverse assembly process and the light guide plate 11's pressing against the reflection plate 12 caused by self-weight.

SUMMARY OF THE INVENTION

An aspect of this document is to provide a liquid crystal display module, which can prevent corrugations of a reflection plate by alleviating constraining points between the reflection plate and other equipment items, and an assembling method thereof.

To accomplish the foregoing advantage, there is provided a liquid crystal display module according to an exemplary embodiment of the present invention, comprising: a liquid crystal panel; a light source assembly for generating a light by a driving power from a light source FPC; a light guide plate for converting the light into a surface light source to irradiate the same toward the liquid crystal panel; a reflection plate disposed at the opposite side of the exiting surface of the light guide plate to reflect the light incident to itself toward the light guide plate; a support main for guiding the light guide plate and the light source assembly through stepped faces formed on inner wall surfaces; and a cover bottom disposed to encompass the support main and the bottom surface of one side of the reflection plate, the reflection plate being disposed to be spaced a predetermined gap from the inner wall surfaces of the support main, the light guide plate being fixed to lateral stepped faces formed on a lateral inner wall surface of the supporter main while maintaining a first gap between the light guide plate and the reflection plate, and the light source assembly being fixed between an inner wall surface of a light incident portion of the support main and an incident surface of the light guide plate while maintaining a second gap between the light source assembly and the reflection plate.

The light guide plate comprises two ribs, respectively, at left and right sides vertical to the incident surface, the first rib being supported from below by the first lateral stepped face of the support main, and the second rib being supported from above by the second lateral stepped face of the support main.

The light source assembly is attached to the bottom surface of the light source FPC.

One side of the light source FPC is supported on a light incident portion side stepped face formed on the inner wall surface of the light incident portion of the support main, and the other side thereof is supported on the exiting surface of the light guide plate.

A gap ensuring member for making the second gap larger than the first gap is interposed between the bottom surface of one side of the light source FPC and a stepped face of the light incident portion and between the bottom surface of the other side of the light source FPC and the exiting surface of the light guide plate.

The reflection plate is arranged spaced 0.4~0.6 mm, preferably, 0.5 mm, from the lateral inner wall surface of the supporter main; the first gap between the light guide plate and the reflection plate is 0.035~0.05 mm; and the second gap between the light source assembly and the reflection plate is larger than the first gap by the thickness of the gap ensuring member.

An assembling method of a liquid crystal display module according to the exemplary embodiment of the present invention comprises: fastening a cover bottom; fastening a support main having first and second lateral stepped faces formed on a lateral inner wall surface and a light incident portion side stepped face formed on an inner wall surface of a light incident portion to the cover bottom; mounting the reflection plate on the cover bottom by spacing the reflection plate a predetermined gap apart from the inner wall surfaces of the support main so as not to be constrained by the support main; fixing a light guide plate with two ribs provided respectively at left and right sides vertical to a light incident surface to the support main, and fixing the first rib among the two ribs on the first lateral stepped face of the support main and fixing the second rib under the second lateral stepped face of the support main to maintain a first gap between the light guide plate and the reflection plate; and mounting a light source FPC having a light source assembly attached to the bottom surface on the light incident portion side stepped face of the support main and the exiting surface of the light guide plate to maintain a second gap between the light source assembly and the reflection plate; and mounting a liquid crystal panel on the light guide plate and the light source assembly.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention.

In the drawings.

DETAILED DESCRIPTION OF EMBODIMENTS

An exemplary embodiment of the present invention will now be described in detail with reference to the accompanying drawings.

Figure 1:
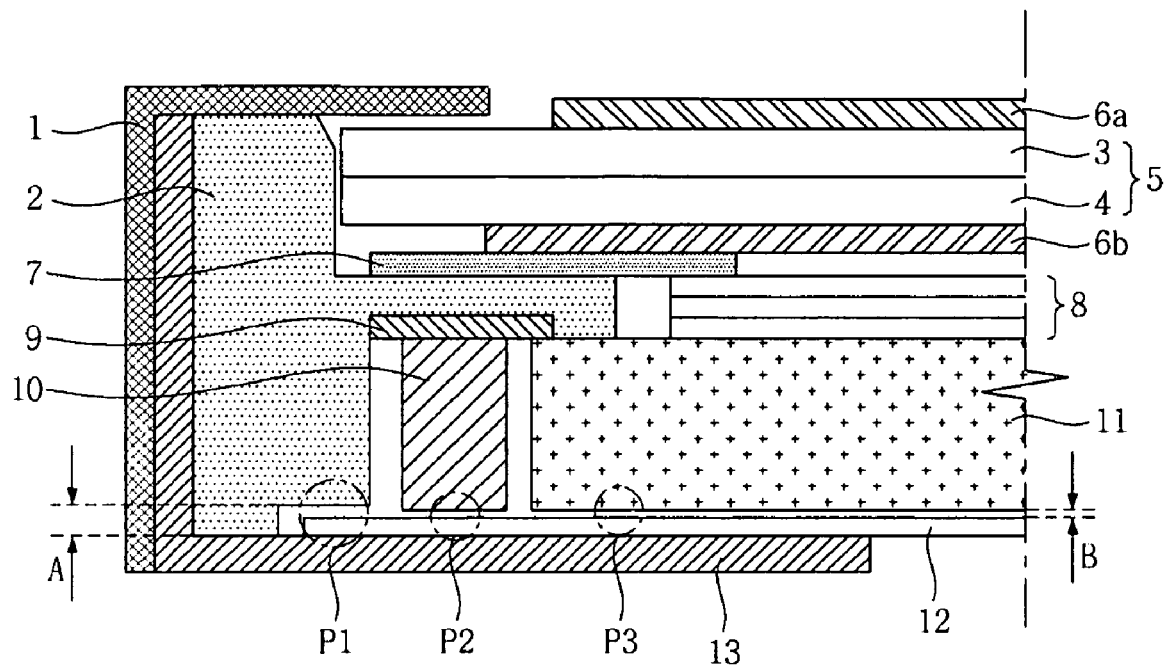
FIG. 1 is a cross sectional view of a light incident portion of a conventional liquid crystal display module.
Figure 2:
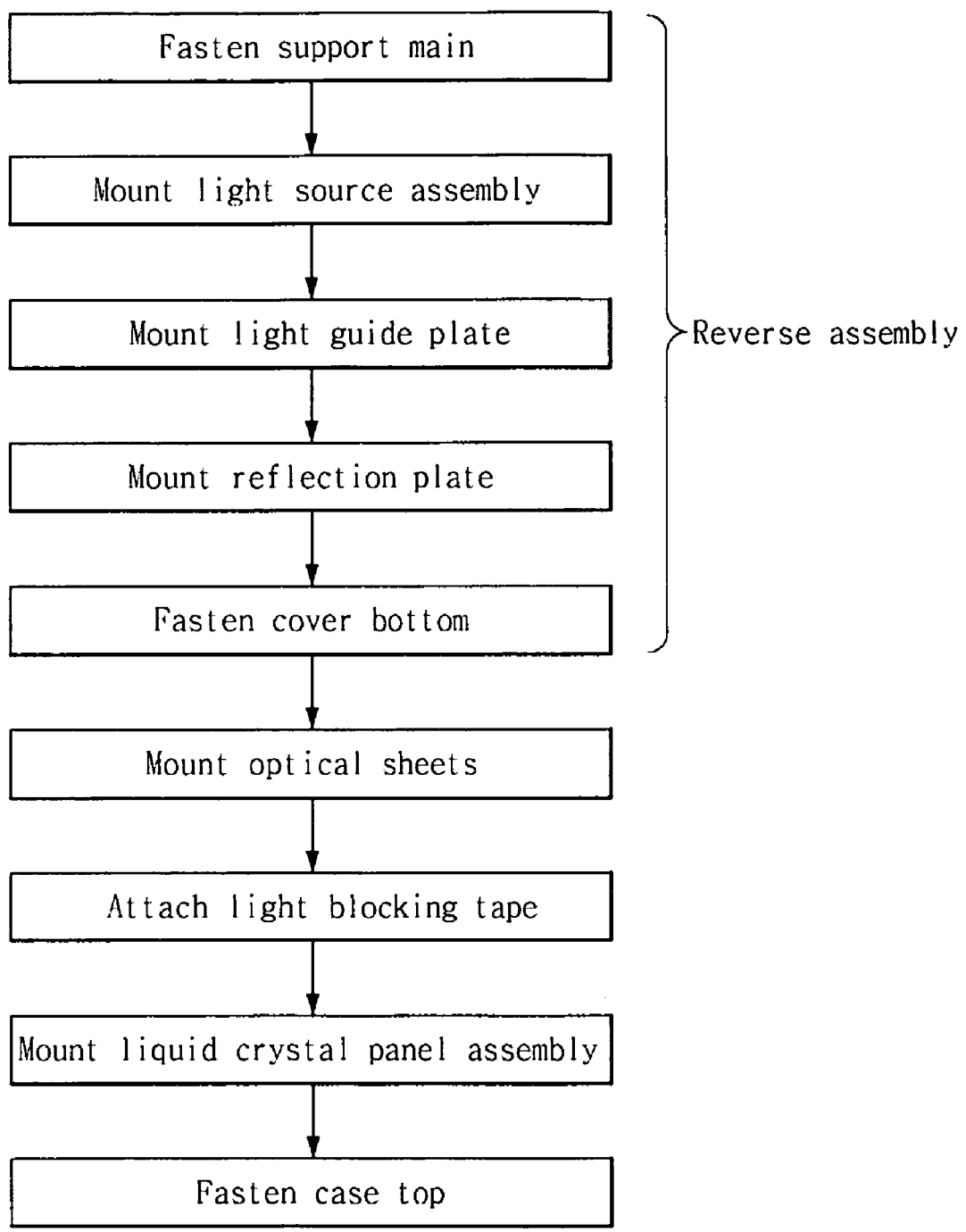
FIG. 2 is a view showing an assembly order of the conventional liquid crystal display module.
Figure 3:
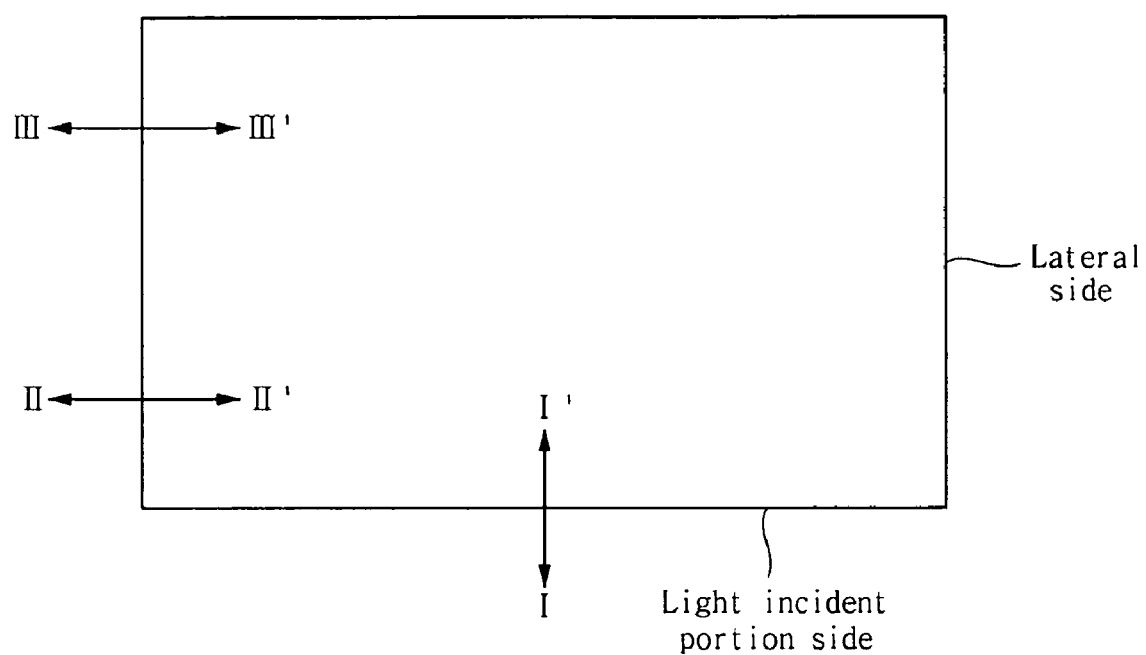
FIG. 3 is a plan view of a liquid crystal display module according to an exemplary embodiment of the present invention.
Figure 4:
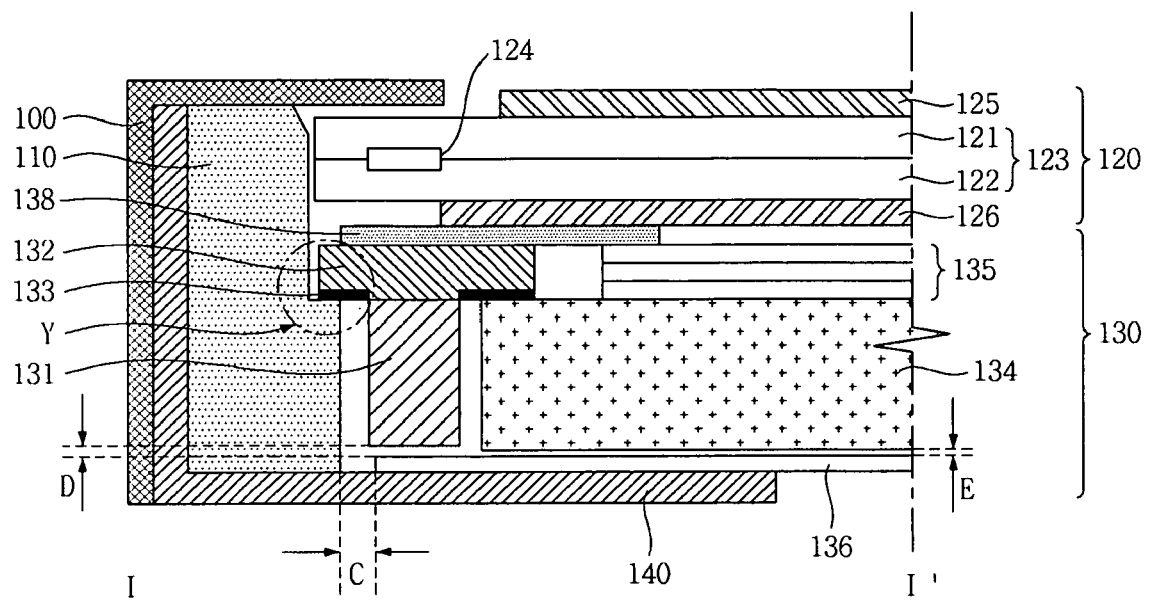
FIG. 4 is a cross sectional view of a light incident portion of the liquid crystal display module according to the exemplary embodiment of the present invention taken along line I-I' of FIG. 3.
Figure 5:
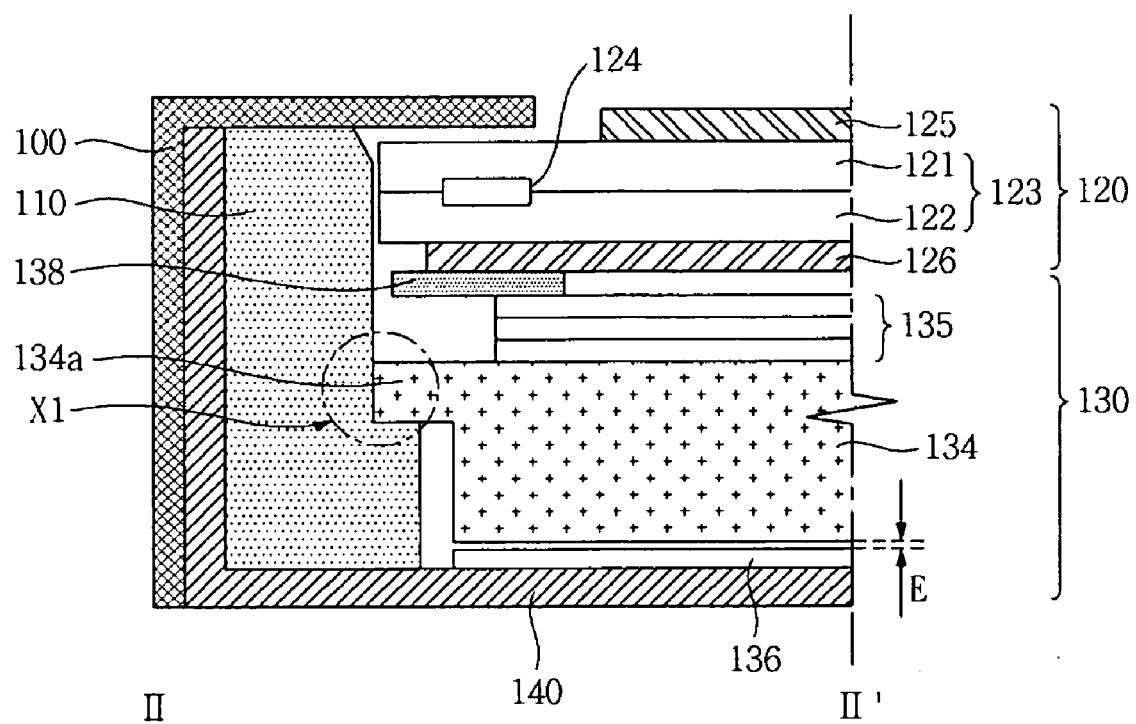
FIG. 5 is a cross sectional view of a first lateral side of the liquid crystal display module according to the exemplary embodiment of the present invention taken along line II-II' of FIG. 3.
Figure 6:
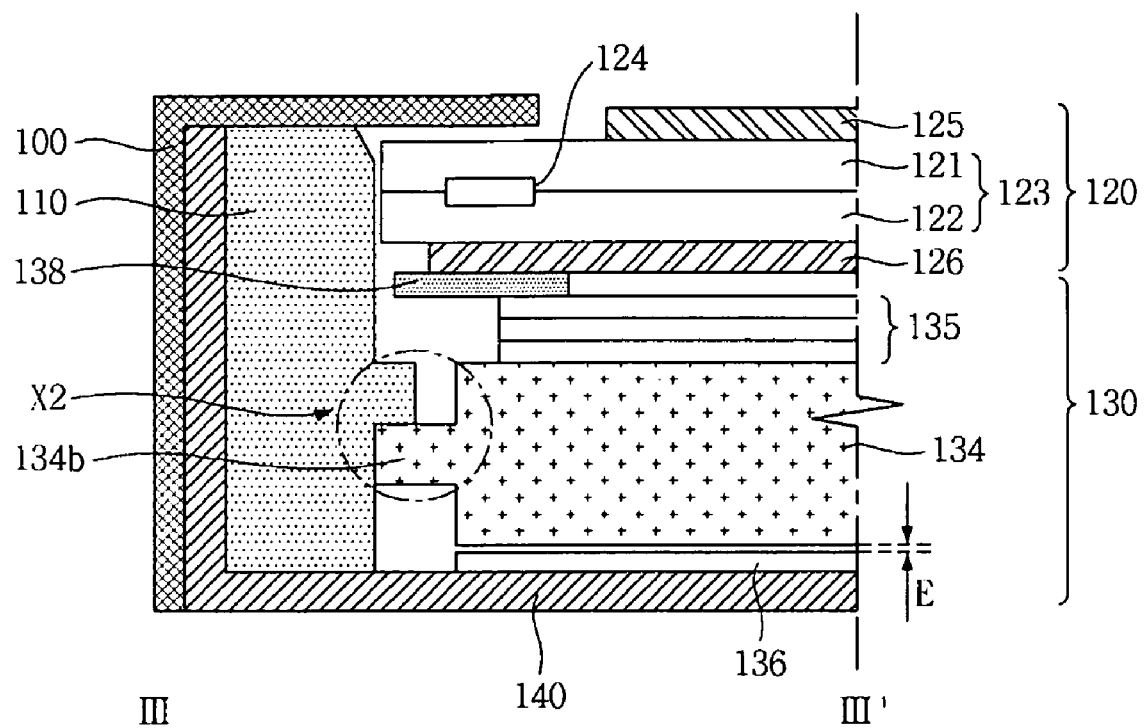
FIG. 6 is a cross sectional view of a second lateral side of the liquid crystal display module according to the exemplary embodiment of the present invention taken along line III-III' of FIG. 3.

FIG. 3 is a plan view of a liquid crystal display module according to an exemplary embodiment of the present invention. FIG. 4 is a cross sectional view of a light incident portion of the liquid crystal display module according to the exemplary embodiment of the present invention taken along line I-I' of FIG. 3. FIG. 5 is a cross sectional view of a first lateral side of the liquid crystal display module according to the exemplary embodiment of the present invention taken along line II-II' of FIG. 3. FIG. 6 is a cross sectional view of a second lateral side of the liquid crystal display module according to the exemplary embodiment of the present invention taken along line III-III' of FIG. 3.

Referring to FIGS. 3 to 6, the liquid crystal display module according to the exemplary embodiment of the present invention comprises a support main 110, a liquid crystal panel assembly 120 and backlight unit 130 stacked inside the support main 110, a cover bottom 140 for encompassing side and bottom surfaces of the support main 110 and a bottom surface of the backlight unit 130, and a case top 100 for encompassing an edge of the liquid crystal panel assembly 120 and a side surface of the cover bottom 140.

The liquid crystal panel assembly 120 comprises upper and lower substrates 121 and 122, a liquid crystal panel 123 including a liquid crystal layer (not shown), a spacer (not shown), and a sealant 124, and upper and lower polarizing plates 125 and 126.

The upper substrate 121 of the liquid crystal panel 123 is provided with a color filter, a common electrode and a black matrix (not shown). Signal lines, such as a data line and a gate line (not shown), are formed at the lower substrate 122 of the liquid crystal panel 123. A thin film transistor (TFT) is formed at an intersection between the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line. A pad area is formed at one side of the lower substrate 122 and is connected to each of the data line and the gate line. A tape carrier package (not shown), having a driver integrated circuit mounted thereon for applying a driving signal to the TFT, is attached onto the pad area. The tape carrier package data signals and scanning signals from the driver integrated circuit to the data lines and the gate lines, respectively. The liquid crystal layer is sandwiched between the upper substrate 121 and the lower substrate 122, and a spacer for maintaining a constant gap between these substrates 121 and 122 is formed therebetween. The upper and lower substrates 121 and 122 are bonded together by a sealant 124, and the upper and lower polarizing plates 125 and 126 are attached onto the front and rear surfaces of each of the substrates.

The support main 110 is made from a molded material, and its inner lateral wall surface is molded into a stepped coverage face. The liquid crystal panel 123 and the backlight unit 130 that irradiates light onto the liquid crystal panel 123 are stacked on the stepped coverage face. Specifically, a light incident portion side stepped face Y for supporting a light source assembly 131 having an FPC 132 as shown in FIG. 4 is provided on an inner wall surface of the light incident portion of the support main 10, and a first lateral stepped face X1 for supporting a first rib 134*a* of a light guide plate 134 as shown in FIG. 5 and a second lateral stepped face X2 for supporting a second rib 134*b* of the light guide plate 134 as shown in FIG. 6 are provided on a lateral inner wall surface of the supporter main 110.

The backlight unit 130 comprises a light source assembly 131 for generating light, a light source FPC 132 attached to the light source assembly 131 to supply a driving power from outside, a light guide plate 134 for converting a light incident from the light source assembly 131 into a surface light source, a reflection plate 136 located in the lower part of the light guide plate 134 for reflecting the light traveling to the lower and side surfaces of the light guide plate 134 towards the upper surface of the light guide plate 134, and optical sheets 135 for controlling the diffusion and the direction of travel of the light after it passes through the light guide plate 134.

The light source of the light source assembly 131 may be any one of a cold cathode fluorescent lamp (CCFL), a hot cathode fluorescent lamp (HCFL), an external electrode fluorescent lamp (EEFL), and a light emitting diode (LED), and preferably may be a light emitting diode (LED). The light source assembly 131 generates light by being driven by a driving power supplied from the light source FPC 132, and makes the generated light incident on the light guide plate 134. Also, the light source assembly 131 is supported by the light source FPC 132 fixed on the stepped face Y of the light incident portion and the exiting surface of the light guide plate 134.

The reflection plate 136 is installed to face the rear surface of the light guide plate 134. The light guide plate 134 allows light incident from the light source assembly 131 to reach a place distant from the light source assembly 131 by means of internal reflection. The light guide plate 134 is generally formed of polymethylmethacrylate (PMMA) with high strength that is not easily transformed or broken and having excellent transmittance. The light guide plate 134 has an incident surface facing the light incident portion of the support main 10 for receiving light from the light source assembly 131 and both side surfaces vertical to the incident surface and parallel to the lateral sides of the support main 110. The first rib 134*a* mounted on the first lateral side stepped face X1 of the support main 110 and the second rib 134*b* supported under the second lateral stepped face X2 of the support main 110 are formed respectively on the both side surfaces of the light guide plate 134. By the fixing of the first and second ribs 134*a* and 134*b* on the lateral sides of the supporter main 110, it is possible to ensure a gap E of 0.035~0.05 mm between the light guide plate 134 and the reflection plate 136 which is enough not to constrain the reflection plate 136 after the assembling of the liquid crystal display module. Accordingly, the phenomenon that the light guide plate 134 is hung by its self weight toward the reflection plate 136 is prevented.

In general, the light source assembly 131 has the same thickness as the thickness (e.g., 6 mm) of the light guide plate 134. However, due to the severe heat generation characteristic of the light source assembly 131, a gap D between the light source assembly 131 and the reflection plate 136 should be larger than the gap E between the light guide plate 134 and the reflection plate 136. For this, a gap ensuring member 133 of a predetermined thickness (e.g., 0.05 mm) is interposed between the stepped face Y of the light incident portion and the light source FPC 132 and between the exiting surface of the light guide plate 134 and the light source FPC 132. The gap D between the light source assembly 131 and the reflection plate 136 becomes larger by the thickness of the gap ensuring member 133 than the gap E between the light guide plate 134 and the reflection plate 136. The gap ensuring member 133 may be replaced by a tape made of a transparent material.

The reflection plate 136 reflects the light incident to itself from the rear surface of the light guide plate 134, thereby acting to reduce light loss. The light from the light source assembly 131 is reflected at a designated tilt angle at the reflection plate 136 of the rear surface to progress uniformly to an exiting surface if the light is incident to the light guide plate 134. At this moment, the light progressing to the lower and side surfaces of the light guide plate 134 is reflected to the reflection plate 136 to progress to the exiting surface. Since the reflection plate 136 is not supported by the support main 110, unlike the conventional art, there is no need to consider the height of the mounting end of the reflection plate of the support main. This is because, though described later, the liquid crystal display module according to the present invention is assembled in a forward assembly order. However, it is preferable for the reflection plate 136 of the present invention to maintain a gap C of 0.4~0.6 mm, preferably, 0.5 mm from the facing side surface of the supporter main 10 in consideration of thermal expansion.

The light exiting through the exiting surface of the light guide plate 134 has its diffusion and progress direction controlled by the optical sheets 135. To this end, the optical sheets 135 include a diffusion sheet for diffusing the light exiting through the exiting surface of the light guide plate 134 to the whole area, a prism sheet for getting the progress angle of the light exiting from the light guide plate 134 to be vertical to the liquid crystal panel 123, and a protection sheet for protecting the second prism sheet.

A light blocking tape 138 is attached along an edge of the optical sheets 135 and an upper surface of the light source FPC 132 to prevent leakage of the light generated from the light source assembly 131.

A cover bottom 140 is disposed to encompass the bottom and side surfaces of one side of the support main 110 and the bottom surface of one side of the reflection plate 136. The cover bottom 140 is formed of a metal material, e.g., aluminum.

The case top 100 is installed to encompass an edge of the liquid crystal panel 123 and a side surface of the cover bottom 140. The case top 100 encompasses the edge of the liquid crystal panel 123 to protect the liquid crystal panel 123 from an external impact.

Figure 7:
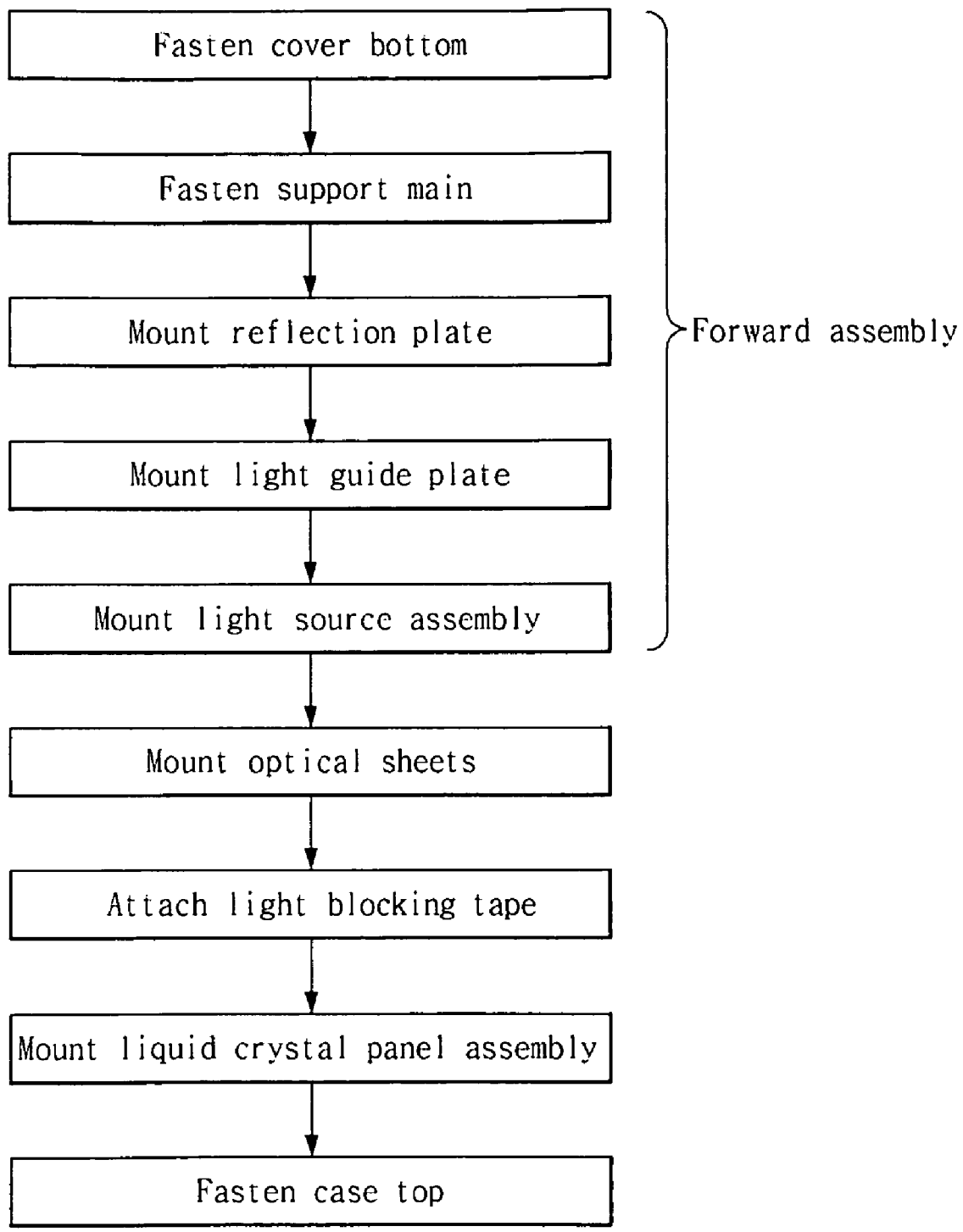
FIG. 7 is a view showing an assembly order of the liquid crystal display module according to the exemplary embodiment of the present invention.

FIG. 7 is a view showing an assembly order of the liquid crystal display module according to the exemplary embodiment of the present invention.

Referring to FIG. 7, the liquid crystal display module according to the exemplary embodiment of the present invention is assembled in a forward assembly order unlike the conventional liquid crystal display module assembled in a reverse assembly order.

Specifically, with regard to the assembly order of the liquid crystal display module according to the exemplary embodiment of the present invention, first, the cover bottom 140 and the support main 110 are sequentially assembled. Next, the reflection plate 136 is mounted on the cover bottom 140 to form a predetermined gap C from the facing side surface of the support main 110.

By mounting the first rib 134a of the light guide plate 134 is mounted on the first lateral stepped face X1 of the support main 110, and supporting the second rib 134b of the light guide plate 134 under the second lateral stepped face X2 of the support main 110, the ribs 134a and 134b of the light guide plate 134 are fixed to the first and second lateral stepped faces X1 and X2 of the support main 110 while forming a predetermined gap E from the reflection plate 136.

By fixing the light source FPC 132 on the stepped face Y of the light incident portion of the support main 110 and the exiting surface of the light guide plate 134, the light source assembly 131 is mounted. At this moment, a gap ensuring member 133 of a predetermined thickness is interposed between the stepped face Y of the light incident portion and the light source FPC 132 and between the exiting surface of the light guide plate 134 and the light source FPC 132, thereby making the gap D between the light source assembly 131 and the reflection plate 136 larger than the gap E between the light guide plate 134 and the reflection plate 136.

After mounting the optical sheets 135 on the exiting surface of the light guide plate 134, a light blocking tape is attached along an edge of the optical sheets 135 and an upper surface of the light source FPC 132 to prevent light leakage. Next, after mounting the liquid crystal panel assembly 120 on the backlight unit 130 having the light blocking tape attached thereto, the case top 100 is fastened so as to encompass an edge of the liquid crystal panel 123 and a side surface of the cover bottom 140.

As described in detail above, the liquid crystal display module and assembling method thereof according to the present invention are implemented in a forward assembly order. Therefore, the liquid crystal display module and assembling method thereof according to the present invention can alleviate constraining points between the reflection plate and other equipment items to prevent corrugations of the reflection plate by mounting the reflection plate on the cover bottom while forming a predetermined gap from a side surface of the support main (no need to manage the conventional dimension 'A'), fixing the light guide plate between the ribs of the support main so as to form a predetermined gap from the reflection plate (easy to manage the conventional dimension 'B'), and interposing a gap ensuring member of a predetermined thickness between the stepped face Y of the light incident portion and the light source FPC and between the exiting surface of the light guide plate and the light source FPC to make the gap between the light source assembly and the reflection plate larger than the gap between the light guide plate and the reflection plate (easy to manage the conventional dimension 'C').

From the above-described details, those skilled in the art will appreciate that various modifications and additions are possible without departing from the technical spirit of the present invention. Accordingly, the technical scope of the present invention is not limited to the detailed description of the specification, but should be defined by the accompanying claims.

What is claimed is:

1. A liquid crystal display module, comprising:
   a liquid crystal panel;
   a light source assembly for generating a light by a driving power from a light source FPC;
   a light guide plate for converting the light into a surface light source to irradiate the same toward the liquid crystal panel;
   a reflection plate disposed at the opposite side of the exiting surface of the light guide plate to reflect the light incident to itself toward the light guide plate;
   a support main for guiding the light guide plate and the light source assembly using stepped faces formed on inner wall surfaces; and
   a cover bottom disposed to encompass the support main and the bottom surface of one side of the reflection plate,
   wherein the reflection plate is disposed to be spaced a predetermined gap from the inner wall surfaces of the support main,
   wherein the light guide plate is fixed to lateral stepped faces formed on a lateral inner wall surface of the supporter main while maintaining a first gap between the light guide plate and the reflection plate, and
   wherein the light source assembly is fixed between an inner wall surface of a light incident portion of the support main and an incident surface of the light guide plate while maintaining a second gap between the light source assembly and the reflection plate.

2. The liquid crystal display module of claim 1, wherein the light guide plate comprises two ribs, respectively, at left and right sides vertical to the incident surface,
   wherein the first rib is supported from below by the first lateral stepped face of the support main, and the second rib is supported from above by the second lateral stepped face of the support main.

3. The liquid crystal display module of claim 1, wherein the light source assembly is attached to the bottom surface of the light source FPC.

4. The liquid crystal display module of claim 3, wherein one side of the light source FPC is supported on a light incident portion side stepped face formed on the inner wall surface of the light incident portion of the support main, and the other side thereof is supported on the exiting surface of the light guide plate.

5. The liquid crystal display module of claim 4, wherein a gap ensuring member for making the second gap larger than the first gap is interposed between the bottom surface of one side of the light source FPC and the stepped face of the light incident portion, and between the bottom surface of the other side of the light source FPC and the exiting surface of the light guide plate.

6. The liquid crystal display module of claim 5, wherein the reflection plate is arranged spaced 0.4~0.6 mm, preferably, 0.5 mm, from the lateral inner wall surface of the supporter main;

wherein the first gap is 0.035~0.05 mm; and wherein the second gap is larger than the first gap by the thickness of the gap ensuring member.

7. An assembling method of a liquid crystal display module, comprising:

fastening a cover bottom;

fastening a support main having first and second lateral stepped faces formed on a lateral inner wall surface and a light incident portion side stepped face formed on an inner wall surface of a light incident portion to the cover bottom;

mounting the reflection plate on the cover bottom by spacing the reflection plate a predetermined gap apart from the inner wall surfaces of the support main so as not to be constrained by the support main;

fixing a light guide plate with two ribs provided respectively at left and right sides vertical to a light incident surface to the support main, and fixing the first rib among the two ribs on the first lateral stepped face of the support main and fixing the second rib under the second lateral stepped face of the support main to maintain a first gap between the light guide plate and the reflection plate; and mounting a light source FPC having a light source assembly attached to a bottom surface thereof on the light incident portion side stepped face of the support main and the exiting surface of the light guide plate to maintain a second gap between the light source assembly and the reflection plate; and mounting a liquid crystal panel on the light guide plate and the light source assembly.

8. The method of claim 7, wherein the maintaining of a second gap between the light source assembly and the reflection plate further comprises interposing a gap ensuring member between the bottom surface of one side of the light source FPC and a stepped face of the light incident portion and between the bottom surface of the other side of the light source FPC and the exiting surface of the light guide plate in order to make the second gap larger than the first gap.

* * * * *